(12) United States Patent
Hütt

(10) Patent No.: US 10,737,474 B2
(45) Date of Patent: Aug. 11, 2020

(54) MATT POLYOLEFIN FILM HAVING RELEASE PROPERTIES

(75) Inventor: Detlef Hütt, Heusweiler (DE)

(73) Assignee: Treofan Germany GmbH & Co. KG (DE)

( * ) Notice: Subject to any disclaimer, the term of this patent is extended or adjusted under 35 U.S.C. 154(b) by 0 days.

(21) Appl. No.: 13/575,768

(22) PCT Filed: Jan. 26, 2011

(86) PCT No.: PCT/EP2011/000335
§ 371 (c)(1),
(2), (4) Date: Jul. 27, 2012

(87) PCT Pub. No.: WO2011/092001
PCT Pub. Date: Aug. 4, 2011

(65) Prior Publication Data
US 2012/0308773 A1 Dec. 6, 2012

(30) Foreign Application Priority Data
Jan. 29, 2010 (DE) .................. 10 2010 006 379

(51) Int. Cl.
| | | |
|---|---|---|
| *B32B 27/08* | (2006.01) | |
| *B32B 27/16* | (2006.01) | |
| *B32B 27/18* | (2006.01) | |
| *B32B 27/32* | (2006.01) | |
| *B32B 27/28* | (2006.01) | |
| *B32B 27/20* | (2006.01) | |
| *B32B 7/06* | (2019.01) | |
| *B32B 7/12* | (2006.01) | |
| *B32B 37/15* | (2006.01) | |
| *B32B 38/00* | (2006.01) | |

(52) U.S. Cl.
CPC .............. *B32B 27/32* (2013.01); *B32B 7/06* (2013.01); *B32B 7/12* (2013.01); *B32B 27/08* (2013.01); *B32B 27/16* (2013.01); *B32B 27/18* (2013.01); *B32B 27/20* (2013.01); *B32B 27/283* (2013.01); *B32B 37/153* (2013.01); *B32B 38/0008* (2013.01); *B32B 2038/0028* (2013.01); *B32B 2250/24* (2013.01); *B32B 2307/406* (2013.01); *B32B 2307/408* (2013.01); *B32B 2307/41* (2013.01); *B32B 2307/412* (2013.01); *B32B 2307/518* (2013.01); *B32B 2307/538* (2013.01); *B32B 2307/732* (2013.01); *B32B 2307/75* (2013.01); *B32B 2310/14* (2013.01); *B32B 2553/00* (2013.01); *Y10T 428/24364* (2015.01)

(58) Field of Classification Search
CPC ....... B32B 27/08; B32B 27/283; B32B 27/32; B32B 2307/408; B32B 2307/412; B32B 2310/14
USPC .................. 428/35.7, 447, 500, 515, 516
See application file for complete search history.

(56) References Cited

U.S. PATENT DOCUMENTS

| | | | |
|---|---|---|---|
| 5,364,704 A * | 11/1994 | Murschall et al. ........... | 428/516 |
| 5,474,820 A * | 12/1995 | Murschall et al. .......... | 428/35.7 |
| 5,560,885 A | 10/1996 | Murschall et al. | |
| 6,322,894 B1 * | 11/2001 | Harley et al. ................ | 428/447 |
| 6,472,077 B1 * | 10/2002 | Cretekos et al. ............. | 428/447 |
| 2004/0023052 A1 * | 2/2004 | Ambroise ..................... | 428/515 |
| 2006/0222867 A1 | 10/2006 | Speith-Herfurth et al. | |

FOREIGN PATENT DOCUMENTS

| | | |
|---|---|---|
| EP | 0563796 A1 | 10/1993 |
| EP | 1518887 A1 | 3/2005 |
| WO | WO-99/59818 A1 | 11/1999 |
| WO | WO-2004089621 A1 | 10/2004 |

OTHER PUBLICATIONS

Evidentiary reference "D1003-11e1 Standard Test Method for Haze and Luminous Transmittance of Transparent Plastics".*
International Search Report for PCT/EP2011/000335 dated Jun. 1, 2011.
English translation of International Preliminary Report on Patentability for PCT/EP2011/000335.

* cited by examiner

*Primary Examiner* — Joanna Pleszczynska
(74) *Attorney, Agent, or Firm* — Faegre Drinker Biddle & Reath LLP

(57) ABSTRACT

The invention relates to transparent multilayer biaxially oriented polyolefin films comprising a base layer and at least one outer matt covering layer, which contains at least two incompatible polymers and has a surface roughness of at least 2.0 [mu]m. The covering layer contains a polydialkyl siloxane having a viscosity of 100,000 to 500,000 mm2/s. The surface of said covering layer is pre-treated by means of corona.

18 Claims, No Drawings

MATT POLYOLEFIN FILM HAVING RELEASE PROPERTIES

RELATED APPLICATIONS

This application is a national stage application (under 35 U.S.C. § 371) of PCT/EP2011/000335, filed Jan. 26, 2011, which claims benefit of German Patent Application No. 10 2010 006 379.7, filed Jan. 29, 2010.

The invention relates to a matt polyolefin having good release properties, particularly in respect of cold seal adhesives.

Foods and other packaged goods are often shrink-wrapped in packaging films, in which case high temperatures, usually above 100° C., have to be used to create the seal seam. In high-speed packaging machines, it can sometimes happen that there is not enough time to transfer the quantity of heat necessary to seal the packaging. For application cases of this kind cold seal adhesives are used, being applied in thin layers and only in the area of the seal seam. The cold seal adhesives are adjusted so that they are able to be bonded even at room temperature and pressure.

Cold seal adhesives are preferably applied immediately after the films have been printed. Once they have been printed and coated with cold seal adhesive, the films or composite films are then stored in rolls until they are needed for use. During storage, steps must be taken to prevent the outside of the composite from blocking or sticking to the cold seal adhesive on the inside of the film or film composite (release effect).

The desired release effect can be achieved in a variety of ways. For example, "release varnishes" made from varnish solutions or dispersions can be applied, but these have to be dried by the application of energy. The processing conditions also have to be controlled carefully in order to ensure that the varnish application is of high visual quality.

Transparent, high-gloss films can also be laminated with a base film, but these only have a low blocking tendency due to their composition and/or surface structure (release film). In this instance, the appearance of the packaging is determined by the shiny appearance of the applied film.

A variety of cold seal adhesives have been developed for different applications, and they differ from each other, in some cases considerably, in terms of their composition and properties. Consequently, the requirements with which release varnishes and release films must comply also vary. Depending on the application, it may be necessary to exert considerable force to unroll the films or film composite coated with cold seal adhesive, even after a release varnish or release film has been applied. In some cases, this even results in delamination of the release varnish, possibly together will all of the printer's ink. This leads to faults in the function of the cold seal adhesive because the adhesive is partially covered by the transferred layers of ink and varnish, and to corresponding imperfections in the print image. At the same time, the storage conditions (temperature, atmospheric humidity) can also affect blocking. In other cases, the cold seal adhesive may be transferred to the outer side. This happens when the adhesive forces between the cold seal adhesive and the opposite surface are stronger than the adhesion between the cold seal adhesive and the film surface or the adhesion of the release varnish and/or printing ink to the film.

Release films are known in the prior art. Preferred films for this purpose are biaxially oriented polypropylene films (BOPP films) whose cover layers are made from PP homopolymers and contain low polysiloxane fractions. However, these films can only be used in conjunction with certain cold seal adhesives. Sometimes their release effect is inadequate. In other cases, the transfer of polysiloxane from the outer surface of the composite to the surface of the cold seal adhesive layer impairs the strength of the adhesive (cold seal deadening).

Matt films are also known in the prior art. These films are predominantly used for packaging that should have a paper-like quality, for bioproducts, for example. A matt appearance can be achieved by various techniques, for example by providing a high filler content in the cover layer or by stamping it in a way that roughens the surface of the film mechanically. There are coatings that are applied after the film has been manufactured. Cover layers made from incompatible polymers are also known to create a matt appearance.

In the context of the present invention, it was round that matt films have a particularly strong tendency to block in the presence of a cold seal adhesive. This probably has something to do with the rough surface structure of the matt layer. The cold seal adhesive is forced into the unevenness in this structure and provides exceptionally good adhesion on this surface. For these reasons, opaque films with vacuoles are often used as the base film, and their surface is coated with cold seal adhesive. Opaque films have an inherent roughness due to the vacuoles contained in the base layer, and this improves the attachment of the cold seal adhesive. For these reasons, films with a matt surface are not suitable for use as release films. Consequently, the visual design options are extremely limited when cold seal adhesives are used to packaging. Yet there is still a need for packaging with matt appearance that can also be used in conjunction with a cold seal adhesive.

The object of the present invention is therefore to provide a transparent polyolefin film with matt appearance, the matt surface of which (first surface) should have a good release effect with respect to cold seal coatings. This release effect should be assured for a wide range of cold seal adhesives. In addition, the film on the (second) surface, which faces the matt layer, should have good adhesion with respect to printing inks or laminating adhesives, so that the second surface of the release may be laminated against a printed or unprinted base film. It must be possible to unroll a roll of the film composite that is coated with the cold seal adhesive smoothly and with low forces. The adhesive strength of the cold seal adhesive must not be impaired by additives in the release film.

This object is solved with a transparent, multilayer, biaxially oriented polyolefin film comprising a base layer and at least one matt outer cover layer, wherein this outer cover layer contains at least two incompatible polymers and has a surface roughness Rz of at least 2.0 µm with a cut-off of 25 µm, and wherein this matt outer cover layer contains a polydialkyl siloxane with a viscosity from 100,000 to 500,000 mm$^2$/s and the surface of this matt outer cover layer has undergone corona surface treatment.

This object is further solved by a laminate made from a polyolefin base film that is laminated against a film as described in claim 1 by means of laminating adhesives or extrusion lamination, wherein the inner surface of the base film is laminated against the inner surface of the film as described in claim 1 and a cold seal adhesive is applied to the outer surface of the base film.

This object is further solved by a film as described in claim 1, the inner surface of which is printed and furnished with a cold seal adhesive.

The dependent claims describe preferred embodiments of the invention.

In the following the surface or layer of the release film that is printed and/or is laminated against the base film and/or is coated with cold seal adhesive as applicable will be referred to as the inner surface or inner cover layer. In packaging applications, this side is usually the side that faces towards the packaged product and for this reason it is also called the inside. Accordingly, the outer surface or outer layer is the opposite cover layer of the release film, the surface of which is in contact with the cold seal adhesive after the laminate or film is rolled up.

In the context of the present invention it was found that a polyolefin film having a matt outer cover layer has very good releasing properties with respect to cold seal adhesives if this cover layer contains a selected polydialkyl siloxane having a viscosity in the range from 100,000 to 500,000 $mm^2/s$ and if the surface of this outer cover layer has undergone a corona treatment process. A laminate consisting of a base film coated with cold seal adhesive and the release film according to the invention demonstrates excellent unrolling characteristics after it has been stored in the rolled state, without any damage occurring to the previously applied cold seal adhesive or straining of the film. Surprisingly, the adhesive strength of the cold seal adhesive also showed no signs of impairment after the laminate was unrolled, even though this is observed when siloxanes are used in the release film. According to the invention, the matt cover layer of the release film must contain polydialkyl siloxane having a viscosity in the range from 100,000 to 500,000 $mm^2/s$ is and must also undergo corona surface treatment in order to assure the desired release effect with respect to the cold seal adhesive layer.

Surprisingly, the corona treatment improves the release properties of the matt surface. According to the prior art, polyolefin films undergo surface treatments to improve their adhesive properties in general, particularly to ensure that the film surface can accept printing. It was thus to be expected that corona treatment would increase the adhesive strength of the matt surface with respect to the cold seal adhesive as well.

Matt films generally have a stronger tendency to block with cold seal adhesives than shiny films with smoother surfaces. This is due to the greater roughness of the matt surface. It is also known that surface roughness is significantly increased by plasma, corona or flame treatment. It was therefore to be expected that corona treatment of the matt cover layer would increase the its surface roughness still further and that this would negatively affect the release properties of the surface treated in this way.

Although corona treatment increases surface roughness and improves adhesive strength, it has been found, surprisingly, that in the case of the film according to the invention, blocking of the matt surface treated in this way was not increased with respect to the cold seal adhesive, but instead the releasing behaviour was improved.

Surprisingly, it was found that the film according to the invention with the selected polydialkyl siloxane has very good releasing properties, not only despite, but indeed as a result of the corona treatment.

It was further found that the polydialkyl siloxane does not hinder processing of the release film to form a laminate, nor does it impair the printability of the inner surface of the release film or the adhesive strength of the cold seal adhesive. It is known from the prior art that polysiloxanes are transferred to a facing surface when they come into contact therewith. This phenomenon is also referred to as the migration effect. It was therefore to be expected that the polysiloxanes would be transferred to the facing inner surface when the release film was rolled up immediately after it was produced, and that this would impair the adhesion properties of this inner surface with regard to printing inks or during lamination, or that the adhesive strength of the cold seal adhesive would be reduced after coating with the cold seal adhesive. However, this is not the case with the films according to the invention.

It was found that that the film according to the invention does not exhibit any of these expected disadvantages. After surface treatment of the matt cover layer, the film that contains the selected siloxane with a viscosity from 100,000 to 500,000 $mm^2/s$ still exhibits very good releasing behaviour. The opposite inner surface of the film lends itself well to printing and/or laminating with a base film to form a composite. The composite coated with cold seal adhesive may be stored as a roll and unrolled later without difficulty. The cold seal adhesive exhibits no impairment of adhesive strength. Even embodiments in which the cold seal adhesive is applied directly to the inner surface of the film according to the invention exhibit good releasing behaviour with respect to the adhesive layer, but no impairment of the adhesive strength of the cold seal adhesive by the polydialkyl siloxane was observed.

In a preferred embodiment, the release film is a three-ply film that has a printable inner cover layer on one surface of the base layer and the matt outer cover layer containing the polydialkyl siloxane according to the invention on the opposite surface thereof. The surface treatment of the matt cover layer is performed in a corona process. If necessary, the surface of the second inner cover layer may also be treated to improve its adhesive properties. The surface of the inner cover layer may be treated using a corona, flame or plasma process. This treated inner surface may be provided with a reverse print if necessary before it is laminated with the base film. However, it is also possible to apply the printing to the inner surface of the base film and to leave the inner surface of the release film unprinted, whether it has been pretreated or not. In any case, the base film is laminated against this inner cover layer of the release film, for example using suitable laminating adhesives. The adhesive strength of the laminating adhesive and the composite adhesion of the laminate is improved by the surface treatment of the inner cover layer. The laminate produced in this way is coated with the cold seal adhesive on the outer surface of the base film and rolled up so that the matt surface of the release film and the surface of the base film with the cold seal adhesive are in contact with one another. This material is supplied to the packaging machines, unrolled and used for packaging products such as foods.

In a further embodiment, the release film may be coated with a cold seal adhesive directly and rolled up as soon as the print has been applied to the inner surface thereof. In these cases, the matt outer surface is in contact with the printed inner surface to which cold seal adhesive has been applied. These rolls too lend themselves to processing without difficulty.

The release film exhibits very good processing and running behaviour even before further processing, and surprisingly even in the case of embodiments that have undergone treatment on both sides. In general, processing of films that have undergone treatment on both sides is difficult because in this embodiment two surfaces with improved adhesive strength are in contact with one another in the film roll.

In a further embodiment of the invention, the release film has an additional intermediate layer between the base layer and the cover layer, that is to say possible embodiments of the release film are constructed from at least three plies, preferably four plies, and possibly even five plies.

In the following text, these layers, which are interposed between the base layer and the respective cover layer, will be referred to as intermediate layers. An outer intermediate layer is positioned between the outer cover layer and the base layer. An inner intermediate layer is correspondingly present between the inner cover layer and the base layer on the opposite side.

It is essential for the purposes of the invention that the release film contains polydialkyl siloxane having a viscosity from 100,000 to 500,000 mm$^2$/s in the matt outer cover layer. The quantity of polydialkyl siloxane in the cover layer is generally in a range from 0.5 to 5% by weight, preferably 0.5-3% by weight relative to the weight of the cover layer. The other layer(s), particularly the second inner cover layer do/does not contain any polydialkyl siloxane.

Polydialkyl siloxanes are polymers in which unbranched chains are formed alternatingly from consecutive silicon and oxygen atoms and in which two alkyl groups are attached to each silicon atom. The terminal silicon atoms in the chains have three alkyl groups. Alkyl groups may be for example alkyl groups having 1 to 5 C atoms, wherein methyl groups, that is to say polydimethyl siloxanes, are preferred. Accordingly, polydialkyl siloxanes have no other functional groups. According to the invention, polydialkyl siloxanes with a viscosity in a range from 100,000 to 500,000 mm$^2$/s, preferably from 150,000 to 400,000 mm$^2$/s, and particularly from 250,000 to 350,000 mm$^2$/s are used. Their viscosity is related to the chain length and molecular weight of the siloxanes. For example, siloxanes with a viscosity of at least 100,000 mm$^2$/s generally have a molecular weight of at least 100,000 and a chain length of more than 14000 siloxane units.

The base layer, and any intermediate layers present, of the various embodiments of the release film described in the preceding is/are generally constructed from a polyolefin, preferably from propylene polymers. The base layer and/or the respective intermediate layer generally contains at least 70-100% by weight, preferably 70 to <100% by weight, and particularly 80 to 99.4% by weight of a propylene polymer relative to the base layer or intermediate layer in each case.

In general, the propylene polymer contains at least 90% by weight, preferably 94 to 100% by weight, particularly 98 to 100% by weight propylene. The corresponding comonomer content of not more than 10% or 0 to 6% by weight or 0 to 2% by weight is generally constituted by ethylene where present. Percentages by weight refer in each case to the propylene polymer. Isotactic propylene homopolymers having a melting point from 140 to 170° C., preferably from 155 to 165° C., and a melt flow index (measurement according to DIN EN ISO 1133 under 2.16° kg load and at 230° C.) from 1.0 to 10 g/10 min, preferably from 1.5 to 6.5 g/10 min. are preferred. The n-heptane soluble portion of the polymers is generally 1 to 10% by weight, preferably 2 to 5% by weight relative to the starter polymer. In another embodiment, highly isotactic polypropylene polymers having a chain isotaxy >95%, preferably 96-98.5% ($^{13}$C-NMR) may be used.

In addition, the base layer and/or the respective intermediate layer may contain usual additives such as neutralisers, stabilisers, antistatic agents and/or lubricants in effective quantities in each case. The base layer is transparent and therefore contains no opacifying additives such as pigments or vacuole initiating particles.

Preferred antistatic agents are alkaline alkane sulphonates, polyether-modified, that is to say ethoxylated and/or propoxylated polydiorganosiloxanes (polydialkylsiloxanes, polyalkylphenyl siloxanes and similar) and/or the essentially unbranched and saturated aliphatic tertiary amines with an aliphatic radical having 10 to 20 carbon atoms substituted with hydroxy ($C_1$-$C_4$) alkyl groups, wherein N,N-bis-(2-hydroxyethyl)alkyl amines having 10 to 20 carbon atoms, preferably 12 to 18 carbon atoms in the alkyl radical are particularly suitable. The effective quantity of antistatic agent is in the range from 0.05 to 0.5% by weight.

Lubricants are higher aliphatic acid amides, higher aliphatic acid esters, particularly monoglyceryl esters, and metal soaps. The effective quantity of lubricant is in the range from 0.01 to 3% by weight, preferably 0.02 to 1% by weight. The addition of higher aliphatic acid amides in a quantity in the range from 0.01 to 0.25% by weight of the base layer, especially erucic acid amide and stearyl amide, is particularly suitable.

The compounds that are normally used to stabilise ethylene polymers, propylene polymers and other olefinic polymers may be used as stabilising agents. These are added in a quantity between 0.05 and 2% by weight. Phenolic and phosphitic stabilisers are particularly suitable. Phenolic stabilisers having a molar mass greater than 500 g/mol are preferred, particularly pentaerythrityl-tetrakis-3-(3,5-di-tert-.butyl-4-hydroxyphenyl)propionate or 1,3,5-trimethyl-2,4,6-tris(3,5-di-tert.butyl-4-hydroxybenzyl)benzene.

Possible phosphitic stabilisers include Ultranox 626, Irgafos 168 and Weston 619, Irgafos 168 being preferred. In this context, phenolic stabilisers are used alone in a quantity of 0.1 to 0.6% by weight, particularly 0.1 to 0.3% by weight, and phenolic and phosphitic stabilisers are used in a ratio from 1:4 to 2:1 and in a total quantity of 0.1 to 0.4% by weight, particularly 0.1 to 0.25% by weight.

Neutralising agents are preferably dihydrotalcite, calcium stearate and/or calcium carbonate having an average particle size not greater than 0.7 μm, an absolute particle size smaller than 10 μm and a specific surface area of at least 40 m$^2$/g.

The percentages by weight indicated in the preceding are relative to the weight of the base layer or the weight of the respective intermediate layer.

The matt outer cover layer of the release film contains at least two incompatible polymers (A) and (B) as essential elements of the invention. For the purposes of the present invention, incompatible means that the two polymers form two separate phases and thus create increased roughness of the surface. In general, the cover layer is constructed from (A) propylene homopolymer, co- and/or terpolymer of propylene, ethylene and/or butylene units and (B) polyethylene. In general, the matt cover layer contains at least 10 to 80% by weight, preferably 20 to 65% by weight, particularly 30 to 50% by weight polyethylene and 20 to 90% by weight, preferably 35 to 80% by weight, particularly 50 to 70% by weight propylene homo-, co- and/or terpolymers relative to the weight of the cover layer. If desired, this cover layer may contain usual additives and additional polymers in effective quantities for each in addition to the named incompatible polymers and the polydialkyl siloxane essential for the purposes of the invention, provided they do not impair the properties of the film that are essential to the invention.

Suitable co- or terpolymers are produced from ethylene, propylene or butylene units, in which case terpolymers contain three different monomers. The composition of the copolymers or terpolymers from the respective monomers may vary within the limits described in the following. In general, the co- and/or terpolymers contain over 50% by weight propylene units, that is to say they are propylene copolymers and/or propylene terpolymers with ethylene and/or butylene units as comonomers. Copolymers generally contain at least 60-99% by weight, preferably 65 to 97% by weight propylene and not more than 1-40% by weight, preferably 3 to 35% by weight ethylene or butylene as the comonomer. Terpolymers generally contain 65 to 96% by weight, preferably 72 to 93% by weight propylene, and 3 to 34% by weight, preferably 5 to 26% by weight ethylene and 1 to 10% by weight, preferably 2 to 8% by weight butylene. The melt index of the co- and/or terpolymers is generally 0.1 to 20 g/10 min (230° C., 2.16 kg), preferably 0.1 to 15 g/10 min. The melting point may be in a range from 70 to 150° C., preferably from 100 to 140° C.

If desired, the co- and terpolymers cited in the preceding may be mixed with each other. In this case, the relative proportions of copolymer to terpolymer may be varied at will. This mixture is then used in the quantities described for the respective copolymers and terpolymers in the matt cover layer.

In a further embodiment, propylene homopolymer may also be used instead of or in addition to the named co- and/or terpolymers. The homopolymers are used in the quantities described for the co- and terpolymers. Suitable propylene homopolymers are those that are described in detail previously as propylene homopolymers of the base layer. If desired, the homopolymers may also be mixed with the co- and/or terpolymers. The proportion of co- and/or terpolymer is then reduced by an amount corresponding to the proportion of homopolymer.

The relative fractions of co- and/or terpolymer and/or propylene homopolymer and polyethylene in the matt cover layer should be selected from the indicated quantity ranges such that the surface roughness Rz of the cover layer is at least 2.5 µm, preferably 3 to 15 µm, particularly 3 to 8 µm (cut-off at 25 µm). If necessary, the roughness may also be influenced by the selection of the layer thickness and/or by adding antiblocking agent in such manner that this Rz value is satisfied. Generally, however, the matt cover layer is essentially free from particulate filler materials, that is to say the quantity thereof is generally less than 5% by weight, preferably less than 2% by weight to avoid adverse phenomena such as chalking or reduced transparency. This recommendation does not preclude the additional introduction of antiblocking agents that are generally used in a quantity of less than 2% by weight.

The second component of the matt cover layer that is essential for the purposes of the invention is a polyethylene that is incompatible with the co- and/or terpolymers and/or propylene homopolymers described above. In this context, incompatible means that a surface roughness is formed when the propylene homopolymers, co- and/or terpolymers are mixed with the polyethylene. This roughness is caused by the two separate phases that form the immiscible polymers. Examples of suitable polyethylenes are HDPE or MDPE. HDPE in general has the properties described in the following, for example an MFI (21.6 kg/190° C.) of greater than 0.1 to 50 g/10 min, preferably 0.6 to 20 g/10 min, measured according to DIN EN ISO 1133 and a viscosity number, measured in accordance with DIN 53 728 part 4 or ISO 1191, in the range from 100 to 450 cm$^3$/g, preferably 120 to 280 cm$^3$/g. Its density, measured at 23° C. in accordance with DIN 53 479 procedure A or ISO 1183, is in the range from >0.94 to 0.96 g/cm$^3$. The melting point, measured by DSC (maximum of the melt curve, heating rate 20° C./min), is between 120 and 140° C. Suitable MDPE generally has an MFI (21.6 kg/190° C.) greater than 0.1 to 50 g/10 min, preferably 0.6 to 20 g/10 min, measured in accordance with DIN EN ISO 1133. The density, measured at 23° C. in accordance with DIN 53 479 method A or ISO 1183, is in the range from >0.925 to 0.94 g/cm$^3$. The melting point, measured by DSC (maximum of the melt curve, heating rate 20° C./min), is between 115 and 130° C.

The matt cover layer may contain small quantities of additional olefinic polymers if necessary, for example less than 10% by weight, preferably less than 5% by weight, providing this does not impair its functionality, particularly the surface roughness or the release properties thereof. In this context, polyolefins that are incorporated in the respective cover layer via additive batches are conceivable, for example.

For the matt cover layer, propylene-ethylene copolymers in a mixture with MDPE or HDPE are preferred. The ethylene content of the copolymers is preferably 2 to 10% by weight and the melting point is in a range from 120-135° C.

The surface roughness Rz of the matt cover layer is generally in a range from 2.5-6 µm, preferably 3-5 µm with a cut-off of 0.25 µm.

The composition of the second inner cover layer, which is generally present in triple and multi-ply embodiments, may be selected independently of the surface-treated matt cover layer, which is essential for the purposes of the invention. The second cover layer may thus be constructed in the same way or differently. Accordingly, it is also possible to apply a second matt layer having the composition described above as the inner cover layer.

In general, the second cover layer contains at least 80 to 100% by weight, preferably 95 to <100% by weight, particularly 98 to <100% by weight of a homo-, co- and/or terpolymer relative to the weight of the second inner cover layer, and where applicable also the usual additives in effective quantities in each case. The fraction of polymer is reduced slightly to reflect the addition of additives of such kind.

Suitable co- or terpolymers are constructed from ethylene, propylene, or butylene units, wherein terpolymers contain three different monomers. The composition of the copolymers or terpolymers from the respective monomers may vary within the limits described in the following. In general, the co- and/or terpolymers contain over 50% by weight propylene units, that is to say they are propylene copolymers and/or propylene terpolymers with ethylene and/or butylene units as comonomers. Copolymers generally contain at least 60-99% by weight, preferably 65 to 97% by weight propylene and not more than 1-40% by weight, preferably 3 to 35% by weight ethylene or butylene as the comonomer. Terpolymers generally contain 65 to 96% by weight, preferably 72 to 93% by weight propylene, and 3 to 34% by weight, preferably 5 to 26% by weight ethylene and 1 to 10% by weight, preferably 2 to 8% by weight butylene. The melt index of the co- and/or terpolymers is generally 0.1 to 20 g/10 min (230° C., 2.16 kg), preferably 0.1 to 15 g/10 min. The melting point may be in a range from 70 to 150° C., preferably from 100 to 140° C.

If desired, the co- and terpolymers cited in the preceding may be mixed with each other. In this case, the relative proportions of copolymer to terpolymer may be varied at will. This mixture may then be used in the quantities described for the respective copolymers and terpolymers in the second cover layer.

In a further embodiment, propylene homopolymer may also be used instead of or in addition to the named co- and/or terpolymers. The homopolymers are used in the quantities described for the co- and terpolymers. Suitable propylene homopolymers are those described in detail in the following as propylene homopolymers of the base layer. If desired, the homopolymers may also be mixed with the co- and/or terpolymers. The proportion of co- and/or terpolymer is then reduced by an amount corresponding to the proportion of homopolymer.

However, in order to obtain good printability that will remain stable for the long term, the propylene copolymers and/or propylene terpolymers described are preferred.

If desired, the additives described previously for the base layer, such as antistatic agents, neutralising agents, lubricants and/or stabilisers, and where applicable antiblocking agents may be added to both the matt outer cover layer and the inner cover layer. The figures in percent by weight then refer correspondingly to the weight of the cover layer.

Suitable antiblocking agents are inorganic additives such as silicon dioxide, calcium carbonate, magnesium silicate, aluminium silicate, calcium phosphate and similar and/or incompatible organic polymerisates such as crosslinked silicones, polymethylmethacrylates (PMMA), polyamides, polyesters, polycarbonates and similar, among which silicon dioxide and crosslinked silicones and PMMA are preferred. The effective quantity of antiblocking agents is in the range from 0.1 to 2% by weight, preferably 0.1 to 0.8% by weight. The average particle size is between 1 and 6 µm, particularly 2 and 5 µm. It is particularly preferred to use an additional 0.1 to 0.5% by weight crosslinked silicone, or PMMA particles, preferably crosslinked PMMA particles, as the antiblocking agent in the matt cover layer.

In general, the second cover layer should not contain any additives that impair the printability or adhesive properties in the inner surface, or the quantities must be kept so low that undesirable effects of such kind are avoided.

The release film according to the invention comprises the layers described in the preceding. For the purposes of the present invention, the term base layer is understood to mean the layer that has the greatest layer thickness and generally constitutes at least 40% of the total thickness. Cover layers are the layers disposed on the outside. The layer thickness of the matt cover layer is generally 1 to 10 µm, preferably 1.5 to 8 µm, particularly 2 to 4 µm. A greater cover layer thickness of at least 2.5 µm is advantageous for increasing the roughness. The optional second cover layers may, but do not have to be of identical thickness. Their thickness is generally in a range from 0.3 to 3 µm, particularly 0.4 to 1.5 µm. By definition, the intermediate layer(s) are applied between the base layer and the cover layer. The intermediate layers are generally between 0.5 and 15 µm thick, preferably 1.0 to 10 µm.

The overall thickness of the release film according to the invention may vary within wide parameters, and is determined to some degree by its intended use. It is preferably in a range from 4 to 60 µm, particularly from 5 to 40 µm, especially from 6 to 30 µm, wherein the base layer preferably constitutes 60 to 99% of the overall thickness of the release film according to the invention.

The invention further relates to a process for producing the inventive release film according to the coextrusion process that is known on its own merits.

In this process, the materials for the individual layers of the film are melted using two to four or more extruders, and the corresponding molten masses are coextruded simultaneously and together through a flat nozzle, the film obtained in this manner is drawn off on one or more rollers to allow it to solidify, the film is then stretched biaxially (oriented), the biaxially stretched film is thermally fixed and it undergoes corona, plasma or flame treatment as applicable for the surface layer, wherein in this process according to the invention at least the matt outer surface undergoes corona treatment.

Biaxial stretching (orienting) is performed sequentially or simultaneously in the lengthwise and/or transverse direction, sequential biaxial stretching being preferred, in which stretching is first performed longitudinally (in the machine direction) and then transversely (perpendicularly to the machine direction).

As is usual in coextrusion processes, in a first step the polymer or polymer mixtures for the individual layers are compressed and liquefied in separate extruders, at which point any optional additives may already be contained in the polymer or polymer mixture. The molten masses are then placed one on top of the other and forced simultaneously through a flat nozzle (flat sheet die), and the multilayer film that emerges is drawn off on one or more take-off rollers at a temperature from 10 to 100° C., preferably 20 to 50° C., so that it cools and solidifies.

The prefilm obtained in this way is then stretched longitudinally and transversely to the extrusion direction, which orients the molecule chains. Lengthwise stretching is expediently carried out using two rollers running at different speeds corresponding to the desired stretching ratio, at a temperature from 80 to 150° C. and with a stretching ratio in the range from 4 to 8, preferably 5 to 6. Transverse stretching is carried out at a temperature from 120 to 170° C. with an appropriate tenter, and the transverse stretching ratios are in a range from 5 to 10, preferably 7 to 9.

The film stretching process is followed by thermal fixing (heat treatment), wherein the film is maintained at a temperature of 100 to 160° C. for about 0.1 to 10 s. The film is then rolled up in the normal way with a takeup mechanism.

As was noted previously, it is an essential feature of the invention that the film on the surface of the matt cover layer undergo corona treatment according to one of the known methods after biaxial stretching. The surface tension is generally in the range from 35 to 50 mN/m, particularly preferably 37 to 45 mN/m. If required, corona, flame or plasma treatment may also be applied to the opposite side of the film.

With corona treatment, the process is advantageously carried out in such manner that the film is fed between two conducting elements serving as electrodes, and a voltage, usually AC voltage, is applied between the electrodes, the voltage being high enough to cause spray or corona discharges (about 5 to 20 kV and 5 to 30 kHz). As a result of these spray or corona discharges the air above the film surface becomes ionised and reacts with the molecules on the film surface, creating polar deposits in the essentially nonpolar polymer matrix.

The release film may be printed either directly on the surface of the inner cover layer and then coated with a cold seal adhesive, or it may be processed further according to one of the methods described below to obtain the laminate according to the invention and the corresponding packaging from the laminate.

In order to produce the laminate, a base film that has undergone treatment on one or both sides is selected and print is applied with standard commercial inks preferably to one or the side that has been treated in preparation for printing. Then, the inner side of the release film is laminated to the base film on this printed side, for example using standard commercial laminating adhesives. Finally, the cold seal adhesive is applied to the second outer surface of the base film. Depending on the type of cold seal adhesive used, this second surface of the base film may also have been pretreated. This is determined by the processing directions for the cold seal adhesive. The printed laminate, coated with cold seal adhesive, is wound up into a roll and subsequently processed further to make packaging.

In general, the "reverse printing" process is also possible; in this process it is not the base film but the inner side of the release film according to the invention to which the print is applied in a "reverse print" method. Otherwise, with regard to the lamination method and the cold seal adhesive application the process is similar to the one described in the preceding.

Various films are suitable for consideration as base films depending on the intended application. Thus for example, transparent, metallised, white tinted or opaque, biaxially oriented polypropylene films are suitable for use as the base film, as are biaxially oriented polyethylene terephthalate films, polyethylene films and even polypropylene cast films that have been pretreated either on both sides or just on the one side to be printed depending on the cold seal adhesive to be used. The use of the release film according to the invention is not limited to the base film types listed. The release film according to the invention may be used to advantageous wherever a base or carrier film is coated on the outer side with a cold seal adhesive, which tends to adhere strongly to a facing surface when it is rolled up. In general, transparent base films are preferred.

Print can be applied to the base film using many different colour systems and an enormous variety of processes. For example, one- and two-component systems are suitable. Possible one-component colour systems include those with a polyvinyl butyral, nitrocellulose or cellulose acetate propionate base, two-component colour systems include those base on epoxy resins and polyurethane resins. At the same time, the use of primers or bonding agents may be helpful for improving ink adhesion.

Lamination of the base film to the release film according to the invention may be carried out using laminating adhesives that contain solvents and that are solvent-free. The "extrusion lamination" process is also conceivable. In this process, the base and release films are bonded with one another after the printing process by extruding a suitable, low-melting thermoplastic in a thin layer between the films to be laminated and pressing the films together firmly with the molten plastic mass between them. As the thermoplastic solidifies, the two films are bonded to one another permanently. The extrusion lamination method is known on its own merits in the prior art. Preferred materials for use as the plastic melt in extrusion lamination are polyethylenes.

Many standard commercial cold seal adhesives are suitable for use in the method. Such cold seal adhesives may be manufactured with natural or synthetic latexes or a combination of natural and synthetic latexes as their base, and these then differ in terms of the suspension agents used, the prescribed processing conditions, storage stability, fixing on the carrier film and sealing seam strengths as well as the sealing pressures and temperatures required for sealing. Suitable cold seal adhesives are manufactured by the companies Henkel, Sun Chemicals, Eukalin, Swale others, to name but a few. However, the use and advantageous releasing effect of the film according to the invention is not in any way limited to the cold seal adhesives cited.

In principle, the various processing steps for producing the laminate according to the invention may be carried out in separate work cycles. Thus for example the composite may be produced independently of the printing and independently of the cold seal adhesive application process. However, processes are preferred in which several or all of the steps described can be performed in a single work cycle. In any case, the cold seal adhesive must not be applied to the composite until lamination has been completed, in order to prevent blocking of the printed and coated base film.

The following measuring methods were used to characterize the raw materials and films:

Melt Flow Index

The melt flow index of the propylene polymers is measured in accordance with DIN EN ISO 1133 under a load of 2.16 kg and at 230° C. The melt flow index of the polyethylenes is measured under a load of 21.6 kg and at 190° C.

Melting Point

DSC measurement, melt curve maximum, heating rate 20° C./min.

Surface Tension

The surface tension was determined using the "ink method" (DIN ISO 8296).

Measurement of Blocking Behaviour/Releasing Properties

Rectangular test specimens are cut to size from the laminates with cold seal adhesive coating produced as described in Example 5. Film plies of these test specimens are stacked on top of each other in such manner that the surface with the cold seal adhesive coating and the outer release side are in contact with one another in each case. In order to be able to clamp the possibly mutually blocking film test specimens in the tensile testing machine, a strip of a few centimetres is covered around the edge, with paper for example. In addition, every second contact surface is covered completely so that two film test specimens lying on top of one another can be separated to allow measurement.

The stack from the single film plies is pressed with a pressure of 100 N/cm$^2$ at room temperature for 24 h using a rocker lever press to simulate the conditions in a roll. Then the film samples from two test specimens are each separated, cut into 30 mm wide strips, and clamped in a tensile testing machine (Zwick for example) in such manner that the release film and the base film are separate from one another at an angle of twice 90°. The force required to separate the film plies is measured. The average of three measurements and the degree to which cold seal adhesive is transferred to the release film, if any, are included in the evaluation.

Measurement of Fixing of the Cold Seal Adhesive

A sample of the release film is printed on the inner side and/or laminated with a printed base film, then the printed inner side of the base film of the composite is coated with cold seal adhesive in accordance with the processing directions and if applicable dried and allowed to mature by storing. Then the cold seal adhesive is placed in contact with an adhesive strip (e.g., tesa adhesive tape or lithography size 25 mm width) under even pressure, the adhesive strip and the film sample whose releasing properties are to be investigated are clamped in a tensile testing machine (e.g., Zwick, material testing device type 1120,25), so that they are separated from one another at an angle of twice 90°. The force required to separate the adhesive tape from the composite is measured. The average of three measurements and the degree to which cold seal adhesive is transferred to the adhesive tape, if any, are included in the evaluation.

Measurement of Seal Seam Strength of the Cold Seal Adhesive

The seal seam strength of the cold seal adhesive is tested on the laminates produced as described in Example 5. The film surfaces covered with cold seal adhesive (except for a strip a few centimetres wide at the edge to enable them to be clamped into the test machine) are brought into contact with one another and welded together at the temperatures specified by the manufacturer (generally room temperature) and with 10 N/cm² pressure. The welded samples are cut into 15 mm wide stripe and clamped into a tensile testing machine (e.g., Zwick, material testing device type 1120,25) by the unwelded ends so that the two plies are separated from one another at an angle of twice 90°. The force required to separate the two welded plies is measured. The average of three measurements is included in the evaluation.

Determination of Molecular Weight

The average molecular weights Mw and Mn the average molecular weight dispersity Mw/Mn were determined with reference to DIN 55 672 Part 1 using gel permeation chromatography. Ortho dichlorobenzene was used instead of THF as the eluent. Since the olefinic polymers under examination are not soluble at room temperature, the entire measurement was carried out at an elevated temperature (135° C.).

Viscosity

The viscosity is measured in accordance with DIN 53019 using a rotational viscometer.

EXAMPLE 1

A transparent, triple-ply film comprising base layer B and one inner and one outer cover layer having a total thickness of 20 μm was produced by coextrusion and subsequent sequential lengthwise and transverse orientation. The outer matt cover layer had a thickness of about 2 μm, the inner cover layer was about 0.6 μm thick.

B Base Layer

~99.88% by wgt. Propylene homopolymer with melting point of 165° C. and melt flow index of 3.4 g/10 min, an n-heptane insoluble fraction of 94%
~0.12% by wgt. N,N-bis-ethoxyalkyl amine (antistatic agent)

Outer Cover Layer: (Release Layer)

~60% by wgt. Propylene homopolymer with melting point of 165° C. and melt flow index of 7.6 g/10 min and an n-heptane insoluble fraction of 94%
~38.5% by wgt. MDPE with MFI of 14.4 g/10 min (21.6 kg and 190° C.); density 0.937 g/ccm3 and melting point 126° C.
1.5% by wgt. Polydimethyl siloxane having viscosity of 300,000 mm²/s.
0.33% by wgt. SiO₂ as antiblocking agent, average particle size 5 μm Inner Cover Layer:

99.9% by wgt. Statistical ethylene-propylene-butylene terpolymer with ethylene content of 3% by weight and butylene content of 7% by weight (the rest propylene) and a melt flow index of 7.3 g/10 min
0.1% by wgt. SiO₂ as antiblocking agent having an average particle size of 5 μm All layers also received neutralising agent and stabiliser in the usual quantities.

Production conditions in the individual process steps were:

| Extrusion: | Temperatures | Base layer: | 250° C. |
|---|---|---|---|
| | | Cover layers: | 250° C. |
| | Temperature of draw-off roller: | | 20° C. |
| Lengthwise stretching: | Temperature: | | 110° C. |
| | Lengthwise stretching ratio: | | 5.5 |
| Transverse stretching: | Temperature: | | 170° C. |
| | Transverse stretching ratio: | | 9 |
| Fixing: | Temperature: | | 150° C. |
| | Convergence: | | 10% |

The surface of the outer cover layer underwent surface treatment in a corona process. After this treatment, the surface tension was 42 mN/m. Roughness Rz on the surface of the matt cover layer was 3.0 μm.

EXAMPLE 2

A film was produced as described in example 1. Differing from example 1, an ethylene-propylene copolymer having an ethylene fraction of 4% by weight (relative to the copolymer) and a melting point of 135° C.; and a melt flow index of 7.3 g/10 min at 230° C. and 2.16 kg load (DIN EN ISO 1133) was used in the matt cover layer instead of propylene homopolymer. The other composition and the process conditions as well as the corona treatment when manufacturing the film were unchanged. The film now had a roughness Rz of 3.3 μm on the surface of the matt cover layer.

EXAMPLE 3

A film was produced as described in example 1. Differing from example 1, the film was also subjected to flame treatment on the surface of the inner cover layer. The other composition and the process conditions as well as the corona treatment when manufacturing the film were unchanged.

EXAMPLE 4

A film was produced as described in example 1. Differing from example 1, a symmetrical film was produced. The inner cover layer now had the same composition as the outer release layer of example 1. The other composition and the process conditions as well as the corona treatment when manufacturing the film were unchanged.

COMPARISON EXAMPLE 1

A film was produced as described in example 1. Differing from example 1, the surface of the matt cover layer did not undergo any surface treatment. The other composition and the process conditions during production of the film were unchanged.

COMPARISON EXAMPLE 2

A film was produced as described in example 1. Differing from example 1, the surface of the matt cover layer did not contain any polydimethyl siloxane. The other composition and the process conditions during production of the film were unchanged.

COMPARISON EXAMPLE 3

A film was produced as described in example 1. Differing from example 1, the polydimethyl siloxane with a viscosity of 300,000 mm²/s was replaced with the same quantity of a polydimethyl siloxane having a viscosity of 30,000 mm²/s. The other composition and the process conditions during production of the film were unchanged.

COMPARISON EXAMPLE 4

A film was produced as described in example 1. Differing from example 1, (as in comparison example 3), the polydimethyl siloxane with a viscosity of 300,000 mm²/s was replaced with the same quantity of a polydimethyl siloxane having a viscosity of 30,000 mm²/s. In addition, the surface of the matt cover layer was not subjected to a surface treatment (as in comparison example 1). The other composition and the process conditions during production of the film were unchanged.

COMPARISON EXAMPLE 5

A film was produced as described in example 1. Differing from example 1, the polydimethyl siloxane with a viscosity of 300,000 mm²/s was replaced with the same quantity of a polydimethyl siloxane having a viscosity of 30,000 mm²/s. In addition, the MDPE in the outer cover layer was replaced with propylene homopolymer, so that this cover layer now contained about 98% by weight of the indicated propylene homopolymer. The other composition and the process conditions during production of the film were unchanged.

EXAMPLE 5

Laminate Production

After their production, the films as described in the examples and comparison examples were processed as release films to form a film composite with a white to opaque base film. Treofan SHD was used as the base film. This is a multilayer, white-opaque BOPP film with CaCO3 and TiO2 in the base layer and an intermediate propylene homopolymer layer shiny side. The SHD base film underwent printing pretreatment on one side and was printed over the full area of the shiny surface. Following application of a solvent-free, two-component PU adhesive to the printing ink, this base film was laminated with the release films described in examples 1 to 4 and comparison examples 1 and 5 with its printed inner side facing the inner side of the release films. Each film composite produced in this way was coated with two different cold seal adhesives over the entire surface opposite the outer matt layer of the release film (as recorded in the table below). The coated composite films were rolled up and corresponding blanks were placed in stacks for test purposes such that the cold seal adhesive was in contact with the matt surface of the release film, and stored in this way until testing was done. The results of the test are summarised in table 1.

EXAMPLE 6

Printing of Example 3

The film produced as described in example 3 was printed on the surface of the inner, flame-treated cover layer by reverse printing. Then, a cold seal adhesive was applied to this printed side.

TABLE 1

Laminates according to example 5

| Release film | PDMS Viscosity mm²/s | PDMS content outer cover layer | Matt cover layer release film | Corona mN/m | Gloss 60° |
|---|---|---|---|---|---|
| B1 | 300,000 | 1.5% | 65% PP/35% PE | 42 | 15 |
| B2 | 300,000 | 1.5% | 65% C2C3 Copo/35% PE | 42 | 15 |
| B3 | 300,000 | 1.5% | 65% PP/35% PE | 42* | 15 |
| B4 | 300,000 | 1.5% | 65% PP/35% PE (both sides) | 42 | 15 |
| VB1 | 300,000 | 1.5% | 65% PP/35% PE | No corona | 15 |
| VB2 | / | / | 65% PP/35% PE | 42 | 16 |
| VB3 | 30,000 | 1.5% | 65% PP/35% PE | 42 | 14 |
| VB4 | 30,000 | 1.5% | 65% PP/35% PE | No corona | 14 |
| VB5 | 30,000 | 1.5% | 98% PP | 42 | 84 |

*Additional flame treatment on the inner surface (44 mN/m)
B = Example;
VB = Comparison example

TABLE 2

Henkel 22-861 cold seal adhesive

| Release film | Seal seam strength Cold seal/Cold seal N/15 mm | Cold seal/Release blocking force N/30 mm | Cold seal transfer to release side |
|---|---|---|---|
| B1 | S = 2.3 | B = 0.9 | No transfer |
| B2 | S = 2.2 | B = 0.8 | No transfer |
| B3 | S = 2.2 | B = 0.9 | No transfer |
| B4 | S = 2.2 | B = 0.7 | No transfer |
| VB1 | S = 1.5 | B = 2.5 | Transfer in spots |
| VB2 | S = 2.4 | B = 2.5 | Transfer in spots |
| VB3 | S = 1.8 | B = 1.4 | Low transfer |
| VB4 | S = 1.6 | B = 2.8 | Significant transfer |
| VB5 | S = 1.6 | B = 0.5 | No transfer |

TABLE 3

Sun Chemicals S 8078 cold seal adhesive

| Release film | Seal seam strength Cold seal/Cold seal N/15 mm | Cold seal/Release blocking force N/30 mm | Cold seal transfer to release side |
|---|---|---|---|
| B1 | S = 2.5 | B = 1.1 | No transfer |
| B2 | S = 2.5 | B = 0.9 | No transfer |
| B3 | S = 2.7 | B = 0.9 | No transfer |
| B4 | S = 2.6 | B = 0.8 | No transfer |
| VB1 | S = 1.7 | B = 3.2 | Significant transfer |
| VB2 | S = 2.4 | B = 3.7 | Complete transfer |
| VB3 | S = 1.9 | B = 2.0 | Transfer in spots |
| VB4 | S = 1.6 | B = 2.6 | Transfer in spots |
| VB5 | S = 1.8 | B = 0.6 | No transfer |

TABLE 4

Release film, each printed on the inner cover layer in the reverse printing process

| Ex. Release film I | Printing ink, base | Scratch resistance immediate | Scratch resistance after 1 day | Wrinkle resistance immediate | Wrinkle resistance after 1 day | Colour adhesion Tesa adhesive strip test immediate | Colour adhesion Tesa adhesive strip test after 1 day |
|---|---|---|---|---|---|---|---|
| B3 | Siegwerk NC 57, blue Nitrocellulose | 3 | 1 | 2 | 1 | 10% | 0% |
| B3 | Siegwerk VL 31, red Polyvinyl butyral PVB | 2 | 1 | 2 | 1 | 5% | 0% |

B1, B2, B4, VB1-VB5 are not intended for reverse printing due to absence of print preparation treatment
Evaluation key for scratch resistance, wrinkle resistance:
1 - no, no colour abrasion
2 - minor
3 - moderate
4 - significant

The invention claimed is:

1. A transparent, multilayer, biaxially oriented polyolefin film comprising a base layer and at least one matt outer cover layer, wherein the outer cover layer consists essentially of two incompatible polymers and has a surface roughness of at least 2.0 µm with a cut-off of 25 µm, wherein the matt outer cover layer contains a polydialkyl siloxane with a viscosity from 150,000 to 400,000 mm$^2$/s and the surface of this matt outer cover layer has undergone corona surface treatment and wherein the surface tension of the surface of the outer cover layer is 37 to 50 mN/m after corona treatment and the mixture of incompatible polymers consists essentially of a propylene polymer and polyethylene polymer which is an MDPE.

2. The film according to claim 1, wherein the polypropylene polymer is a propylene copolymer or a propylene terpolymer or a propylene homopolymer.

3. The film according to claim 1, wherein the polypropylene polymer is a propylene copolymer and/or propylene terpolymer.

4. The film according to claim 1, wherein the matt cover layer contains >0.5% by weight polydialkyl siloxane relative to the weight of the cover layer.

5. The film according to claim 1, wherein the matt cover layer further contains an antiblocking agent.

6. The film according to claim 5, wherein the antiblocking agent is a crosslinked silicone or crosslinked polymethyl methacrylate particles.

7. The film according to claim 1, wherein the matt cover layer has a thickness from 1 to 10 µm.

8. The film according to claim 1, wherein the inner surface of the film is printed and furnished with a cold seal adhesive.

9. The film according to claim 1, wherein the matt outer cover layer contains a polydialkyl siloxane with a viscosity from 250,000 to 350,000 mm$^2$/s.

10. The film according to claim 1, wherein the polydialkyl siloxane is polydimethyl siloxane.

11. The film according to claim 1, wherein the polydialkyl siloxane is present in an amount from 0.5 to 5% by weight in the cover layer.

12. The film according to claim 1, wherein the polydialkyl siloxane is present in an amount from 0.5 to 3% by weight in the cover layer.

13. The film according to claim 1, wherein the polydialkyl siloxane is present in an amount of 1.5% by weight in the cover layer.

14. A laminate of a polyolefin base film that has been laminated with a film as described in claim 1 by means of laminating adhesive or extrusion lamination, wherein the inner surface of the base film is laminated with the inner surface of the film as described in claim 1 and a cold seal adhesive is applied to the outer surface of the base film.

15. The laminate according to claim 14, wherein the inner surface of the base film is printed.

16. The laminate according to claim 14, wherein the inner surface of the film is reverse printed.

17. A process to produce a packaging product which comprises utilizing the laminate according to claim 14, wherein the outer side of the film forms the outer side of the packaging.

18. A process to produce a packaging product which comprises utilizing the film according to claim 1 to produce a packaging product, wherein the outer side of the film according to claim 1 forms the outer side of the packaging.

* * * * *